United States Patent [19]

Wevelsiep et al.

[11] 4,403,339
[45] Sep. 6, 1983

[54] METHOD AND APPARATUS FOR THE IDENTIFICATION OF OBJECTS

[75] Inventors: Klaus Wevelsiep, Kriftel; Hans Scholze, Dreieich, both of Fed. Rep. of Germany

[73] Assignee: Scranton GmbH & Co., Elektronische Lesegerate KG, Fed. Rep. of Germany

[21] Appl. No.: 198,983

[22] Filed: Oct. 21, 1980

[30] Foreign Application Priority Data

Oct. 23, 1979 [DE] Fed. Rep. of Germany ....... 2942747
Apr. 15, 1980 [DE] Fed. Rep. of Germany ....... 3014350

[51] Int. Cl.³ ............................................. G06K 9/32
[52] U.S. Cl. .................................... 382/44; 235/463; 235/485; 382/61
[58] Field of Search ............. 340/146.3 H, 146.3 AH, 340/146.3 Z; 235/463, 464, 483, 485, 495, 462; 382/44, 61

[56] References Cited

U.S. PATENT DOCUMENTS

| | | | |
|---|---|---|---|
| 3,246,126 | 4/1966 | Schlieben et al. | 340/146.3 H |
| 3,553,437 | 1/1971 | Boothroyd | 340/146.3 H |
| 3,693,154 | 9/1972 | Kubo et al. | 340/146.3 H |
| 3,801,775 | 4/1974 | Acker | 340/146.3 H |
| 3,847,346 | 11/1974 | Dolch | 340/146.3 H |
| 3,852,573 | 12/1974 | Dolch | 340/146.3 H |

*Primary Examiner*—Leo H. Boudreau
*Attorney, Agent, or Firm*—Townsend & Townsend

[57] ABSTRACT

Disclosed is a system for identifying objects appearing on an image window and bearing on a surface facing the window an identification in the form of a data field which includes at least one data track bearing contrasting symbols and a plurality of contrasting line patterns which identify the position and orientation of the data track. The window is optoelectronically scanned in a parallel line raster to generate a video signal which corresponds to the scanned contrast sequence appearing at the window. The contrasting line patterns are initially identified in a stationary detection raster and the angular inclination of the raster lines relative to the contrasting line pattern is determined. Thereafter, the symbols in the data track are read in a reading raster having relatively narrowly spaced raster lines by electronically rotating the reading raster through the intersection angle between the previously detected contrasting line pattern and the detection scan lines so that the reading scan lines are parallel to the data track. Thereafter, the data track is scanned and the symbols therein are decoded and further used.

10 Claims, 13 Drawing Figures

METHOD AND APPARATUS FOR THE IDENTIFICATION OF OBJECTS

BACKGROUND OF THE INVENTION

This invention relates to a method for identifying objects appearing at random positions, in random orientations, and at random times on an image window and having, on a surface facing the image window, an identification in the form of a field which includes on at least one data track contrasting symbols and a plurality of given contrasting line patterns, or a product identification code (PIC). The latter identifies the position and orientation of the data track(s) and comprises a plurality of lines having a variable line spacing and/or line widths. In use, the image window is opto-electronically scanned line-by-line and a video signal is generated which reflects to the scanned contrast sequence.

In a first method step, the image window is scanned in a fixed or stationary detection raster configuration (hereinafter simply "raster") and, upon identification of the individual contrasting line patterns, their position or orientation within the detection raster is determined. In a second method step, the angle $\beta$ at which the data tracks(s) and the lines of the detection raster intersect is determined. In a third method step, sometimes referred to as the reading step, the data field is scanned in direction of the data track(s) in a readout raster which is rotated by the angle $\beta$ to thereby read and decode the symbols or indicia on the data track(s). Alternatively, the the detection raster is rotated in predetermined angular increments $\Delta\alpha$ and scanned. The readout raster is then rotated in direction of the data track(s) by the angle $\beta$ and the angular increments $\Delta\alpha$.

Such method and apparatus are already known. The objects to be identified are, for example, commercial products, department store articles or the like which bear machine readable markings. For this purpose, appropriate identifications are applied to the objects by imprinting thereon a desired code, for example the well-known OCR code. The encoded information may relate to the quality, size, price, the number of articles, and the like and is applied to the surface of the goods in any desired manner.

It is difficult to machine read such information since the objects vary in size and since the information is frequently printed on adhesive labels which are applied to the article at random locations. Therefore, it cannot be assumed that the information is present at a specific location with a fixed orientation and at predetermined time intervals. Thus, the reading of such codes cannot be compared with the reading of punched cards or the like, where a card is available in a precisely defined position at precisely fixed times. In the present case, the exact opposite applies. The data field on the object appears with only rough approximation at a specific place, and the orientation of the data field is relatively arbitrary.

Such methods and apparatus for the identification of objects are used, for example, at the check-out counters of supermarkets and the like in order to identify the price and/or the number of articles which a customer wishes to buy and which he has brought to the counter for this purpose. The articles, such as boxes of varying shapes and sizes, bottles, cartons, cans, and the like, are then placed individually over an image window with the surface bearing the data field directed toward the window. The data fields on the various objects thus appear in variable orientations at differing locations within the image window. The data fields also do not appear at the scanning station at fixed time intervals. Thus, the scanning station must be able to search for the data field and, once found, must read the data track symbols in the direction of the data tracks of the field. The read symbols can then be fed to the cash register in the form of electric impulses so that the register can print out on the receipt the price, the number of the articles, its classification, etc.

The data field applied to the article includes a contrasting line pattern or product identification code ("PIC") which is formed by a plurality of parallel lines of varying spacing and/or line width. The contrasting line pattern reliably and clearly distinguishes the data field, for example the printed label, from other indicia or line patterns which may be present on the object in the vicinity of the data field. Further, within the data field the contrasting line patterns have given positions and orientations which can be used to ascertain the position and orientation of the data tracks relative to the raster lines in order to subsequently generate a raster in direction of the data tracks so that the symbols on the data tracks can be read.

German Offenlegungsschrift No. 2,338,561 discloses a method and an apparatus of the above described type wherein the identification of the contrasting line pattern occurs only when the lines of the pattern are oriented substantially perpendicularly to the scanning direction and the resulting pulse sequence of a video signal generated thereby equals a predetermined pulse sequence which corresponds to the contrasting line pattern used. Thus, the disclosed method is a correlation method. In the method and the corresponding apparatus described in the German Offenlegungsschrift the line deflection signal is a constantly and linearly ascending saw tooth signal which results in a constant scanning of the individual raster lines. The relative position of the contrasting line pattern—and thereby of the data tracks—to the raster lines is determined by storing the amplitudes of the line ramp generator and the line advance ramp generator for the point of intersection between a raster line and the contrasting line pattern, when the latter has been recognized by the PIC decoder. The detection operation is continued until at least two points of intersection A, B appear between the raster lines and the contrasting line pattern. The relative angular position between the contrasting line pattern and the raster lines can be calculated on an analog basis from the amplitude coordinates of the points of intersection.

Storage of the analog amplitude signals for the points of intersection between the raster lines and the PIC for the subsequent analog calculation of the relative position of the PIC—and of the data tracks—is cumbersome. It is also disadvantageous because in addition to the line pulse counters for identifying the PIC, suitable analog circuits are required. Finally, the stored analog amplitude values are subject to time and heat drift, and there is no assurance for an accurate correlation between the line deflection voltage, which constantly varies in time, with specific points of intersection within the line raster. Thus, the determination of an angle between the raster lines and the contrasting line pattern or the data tracks lacks accuracy.

SUMMARY OF THE INVENTION

In contrast, it is an object of the invention to provide a method and an apparatus of the above described type which enable a rapid and reliable scanning of the data field and a precise and reliable determination of the angle between the raster lines and the contrasting line pattern during the detection step. This assures during the subsequent reading operation that the contrasting symbols on the data tracks are correctly read.

This object is achieved in accordance with the invention with the method of the above described type wherein:

(a) each contrasting line pattern has lines which are closed within themselves and extend at a constant spacing between them;

(b) during scanning through, the lines which have already been scanned are counted and are available as a first count, and a second count proportional to the length of the currently scanned track is generated and available, the two counts representing the "actual coordinates" (x, y) of the currently scanned raster point in a corresponding raster-constant numerical coordinate system;

(c) the numerical coordinates $(x_p, y_p)$ corresponding to the points of intersection between raster lines and contrasting line patterns (PIC) are stored while scanning through the detection raster when the respective contrasting line pattern (PIC) is simultaneously identified; and (d) in the second method step, the raster-constant central coordinates $(x_z, y_z)$ of the contrasting line pattern are calculated from the stored numerical coordinates $(x_p, y_p)$, and the angle of intersection $\beta$ between the lines of the detection raster and the data track(s) is calculated from the central coordinates $(x_z, y_z)$.

An alternative embodiment of the invention step (a) provides that a contrasting line pattern of a first type defined by parallel lines is imprinted on the data field and given a first line spacing sequence in a first direction, and a contrast line pattern of a second type—also of parallel lines—is imprinted and given a second line spacing sequence in a second direction. After completion of steps (b), (c), the angle of intersection $\beta$ between the raster lines of the detection raster and the track(s) of the data field are calculated pursuant to method step (d) from the stored numerical coordinates $(x_p, y_p)$.

A further alternative embodiment of the invention provides at least one given contrasting line pattern (PIC) of a plurality of parallel lines on the data field. In a first step, the detection operation, the field is scanned in a raster having a relatively large line spacing and at varying angles until the contrasting line pattern or patterns is or are intersected by at least two raster lines and thereby is or are identified. In a second step, the data field is calculated from the angle of intersection between the raster lines of the last scan through the detection raster and the data track(s). In a third step, the field is scanned in a reading raster with a relatively small or narrow line spacing. The reading raster is oriented so that its lines are at an angle which is equal to the sum of the calculated angle of intersection $\beta$ and the last-adjusted detection angle $\alpha_l$.

The invention also provides an apparatus for practicing the above outlined method of the invention.

An advantage of the invention is that both a line deflection and a line advance signals are generated by a digital counter followed by digital/analog converters (DAC) so that, in addition to an incremental or, alternatively, a continuously rising line deflection and line advance signal, corresponding counts or numerical values are available which define the currently scanned raster point.

The counts form a raster-constant numerical coordinate system, so that the currently scanned raster point is always available as a digital number in both counters. The coordinates of the point of intersection required for determining the angle $\beta$ between the raster lines and the contrasting line patten (PIC) are therefore available in digital form when a PIC is identified and can be stored for further processing. A precise and reliable identification of the required coordinates of the point of intersection in digital form is therefore possible—without further electronic devices—merely from the deflection generators. The angle between the PIC and the raster lines can then be digitally determined with great precision and the raster can be precisely adjusted for the reading of the data tracks, thus reducing the probability of errors during readout of the symbols in the data tracks.

In a particularly preferred embodiment, the DAC which follows the first counter converts the count of the latter into a line deflection signal which advances as a function of time incrementally or continuously, and makes possible a point-by-point scanning of the raster lines.

The contrasting line pattern comprising a plurality of closed lines extending at a constant spacing from each other are preferably concentric circular lines. This form has the advantage that the contrasting line pattern can be scanned and identified at an angle. In particular, with this type of contrasting line pattern it is possible to calculate in a simple manner the center coordinates of the contrasting line pattern with a substantially central scan. Once the central coordinates of the concentric contrasting line patterns imprinted on the data field are known, the orientation of the data tracks relative to a straight line, which is determined by the center coordinates of the line patterns, can be calculated in a second step. Most preferred is the provision of three circular concentric line patterns arranged on a straight line in the data field so that the orientation of this straight line can be determined redundantly.

If, on the other hand, an image field projected onto a target is scanned in a detection raster the angular orientation of which is incrementally varied, it is preferred to employ a contrasting line pattern (PIC) having a plurality of straight lines of variable width and spacing for determining the position and orientation of the data tracks.

In the third method step (reading step) the raster is of a smaller size as compared to the raster employed in the first method step (detection step). The raster size is adapted to the data field to be read out and has the greatest possible raster line density. This enables the scanning of the data field during the reading step in the shortest possible time.

It is particularly preferable that the length of the individual contrasting line patterns or their spacing also defines the size of the data field. For this purpose, a plurality of line patterns of a given size may for example be imprinted ahead of and behind the data tracks. The spacing between adjacent raster lines in the detection operation is sufficiently small so that during passage of the last scan through the detection raster a plurality of raster lines intersect the contrasting line pattern or patterns. The center coordinates of the contrast line patterns—and thereby the length or size of the data field—are then calculated in the numerical coordinate system of the last detection raster from the numerical intersection coordinates. The length of the data field is subsequently calculated in the numerical coordinate system of the reading raster which is rotated relative to the detection raster by the angle of intersection $\beta$. The reading raster is thereupon limited to about the size of the data field. For this purpose, the lower and the upper limits of the count interval of first and the second counters are set to value correspond to the size of the data field.

Alternatively, only one contrasting line pattern with parallel lines of a given length is used, from which the length of an edge of data field to be scanned can be determined. The length of the other side of the data field is then predetermined.

Figure 8:
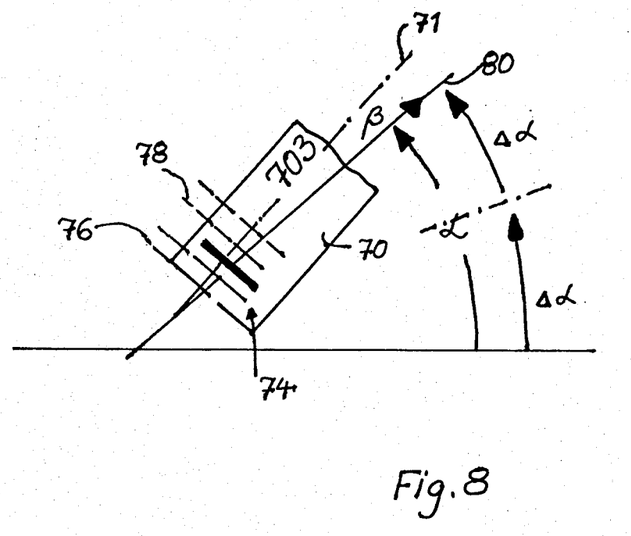
FIG. 8 shows a fifth embodiment of a data field having a contrasting line pattern of parallel lines.
Figure 9:
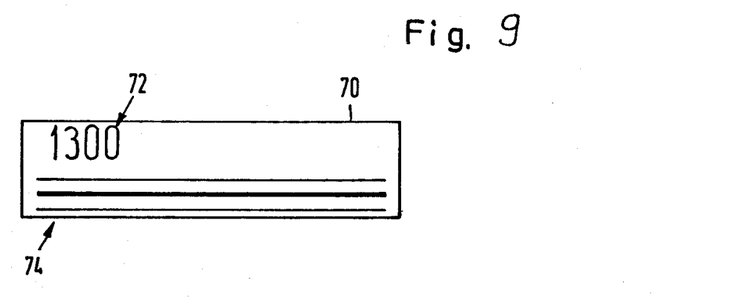
FIG. 9 shows a sixth embodiment of a data field having a contrasting line pattern of parallel lines.
Figure 10:
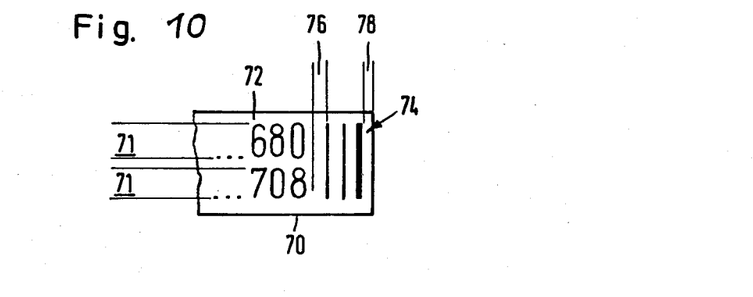
FIG. 10 shows a seventh embodiment of a data field having a contrastiing line pattern of parallel lines and two data tracks.
Figure 11:
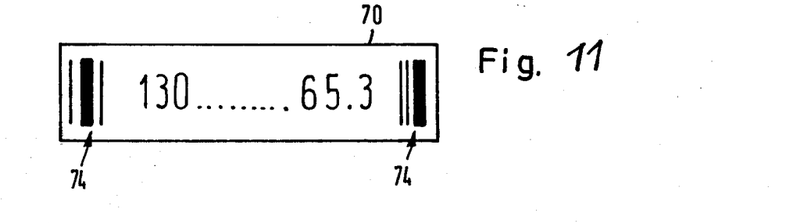
FIG. 11 shows an eighth embodiment of a data field having two parallel contrasting line patterns of parallel lines and a data track.

The contrasting line pattern is then, for example, in front of or behind the data tracks and extends prependicular with respect to the data tracks (FIGS. 8, 10 and 11). Alternatively, the contrasting line pattern is located beneath the data tracks and extends parallel to them (FIG. 9).

If, according to another embodiment of the invention, contrasting line patterns of the first and second type having a first and a second line spacing sequence of parallel lines are used, a contrasting line pattern of the first type preferably extends parallel to the data track of the data field, and the contrasting line pattern of the second type is perpendicular to the data track. At least one contrasting line pattern of the first type and one contrasting line pattern of the second type are so long that, during scanning through the detection raster, they are intersected by at least two raster lines so that the direction of the line patterns can be calculated from the coordinates of the point of intersection between the raster lines with the line patterns.

A line pattern of the second type is preferably disposed directly ahead of a line pattern of the first type. In addition, or alternatively, a further line pattern of the second type is disposed immediately behind the line pattern of the first type. All three line patterns extend over a given distance perpendicular to the data tracks. The length of the line pattern of the first type preferably corresponds substantially to the length of the data tracks. Alternatively, the line patterns of the second type may also be disposed beneath the line pattern of the first type. With such a length and arrangement of the first or line patterns, at least one line pattern of the first or second type is intersected by at least two raster lines during scanning through the detection raster. The coordinates of the point of intersection can thereby be determined and they are sufficient for calculating the orientation of the respective line patterns and thereby also of the orientation of the data tracks. A particular advantage of the above arrangement is that the data tracks are free of line patterns, so that the eye of an observer can readily recognize the symbols contained in the data tracks.

In another embodiment of the invention, the contrasting line patterns of the first and of the second type—which have parallel lines extending perpendicularly to each other—are alternatingly disposed in a contrasting line pattern track. The orientation of this track relative to the data track or tracks is known and the line pattern track preferably extends at a given distance beneath the data tracks. The length of the contrasting line patterns is such that during scanning through the detection raster each line pattern is at least once intersected by a raster line. The angle of intersection between the raster lines of the detection raster and the data tracks is calculated from the stored numerical coordinates when at least all line patterns of the first type or all line patterns of the second type are intersected within the contrasting line pattern track. Numerical coordinates of the points of intersection are stored and can be used for determining the presence and the direction of the line pattern track. It is an advantage that the individual contrasting line patterns can be relatively small, that only one line pattern track is present beneath the data tracks so as to not impair the legibility of the symbols on the data tracks, and, particularly, that the orientation of the contrasting line pattern track can be determined with a high degree of redundancy since either all line patterns of the first type or all line patterns of the second type are intersected at an angle which is larger than 45°. In such an arrangement, the entire contrasting line pattern is of about the same size as a single line pattern of relatively long lines located beneath the data tracks. Because of the perpendicular line patterns of the first and second type alternate, the group of line patterns of the first type or the group of patterns of the second type are always precisely identified on the image screen irrespective of the orientation of the data field and without the need for rotating the detection raster incrementally relative to the data field.

During reading the raster line density is preferably as high as possible. For this purpose, the incremental advance of the second counter is at the lowest possible value, the value 1. The increments of the line advance signal thereby have the smallest possible value which insures a line advance from one line to the next adjacent one.

In contrast, during the detection operation, the increment of the second counter preferably has a relatively high value, for example the value 10. The incremental line advance signal thereby has the tenfold value as compared with the reading operation, so that at the end of a line a jump of ten lines is made, that is, only each tenth line is scanned.

The raster rotating circuit preferably has a read-only memory (ROM) which stores the sine and cosine values of all possible angles of rotation. Each output of the ROM is applied to a digital-analog converter. The raster rotating circuit further has a first analog multiplier which multiplies the line deflection signal with the cosine of the desired angle of rotation, a second analog multiplier which multiplies the line deflection signal with the negative sine of the angle of rotation, a third analog multiplier which multiplies the line advance signal with the cosine of the angle of rotation, and a fourth analog multiplier which multiplies the line advance signal with the sine of the angle of rotation. The output of the first and fourth multipliers is added in a first adding unit and the sum is fed to the first output of the raster rotating circuit. The output of the second and third multipliers is added in a second adding unit and its sum is fed to the second output of the raster rotating circuit. In this embodiment it is of particular advantage that the cosine and the sine of all desired angles of rotation are stored in a memory and can be read, for example by a central processor, into the raster rotating circuit. Thus, the digital storage of the required sine and cosine values makes a precise rotation of the raster possible.

DESCRIPTION OF THE PREFERRED EMBODIMENT

Figure 1:
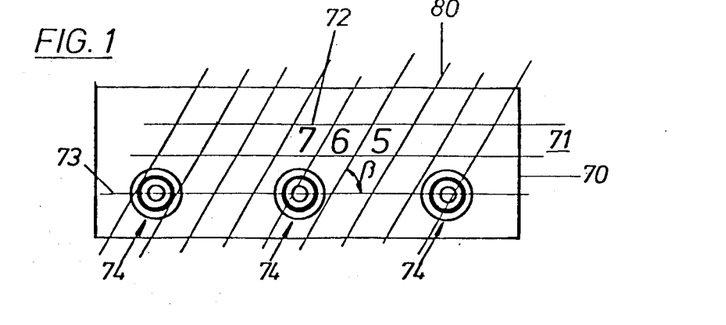
FIG. 1 shows a first embodiment of a data field with three identical, self-enclosed contrasting line patterns.
Figure 4:
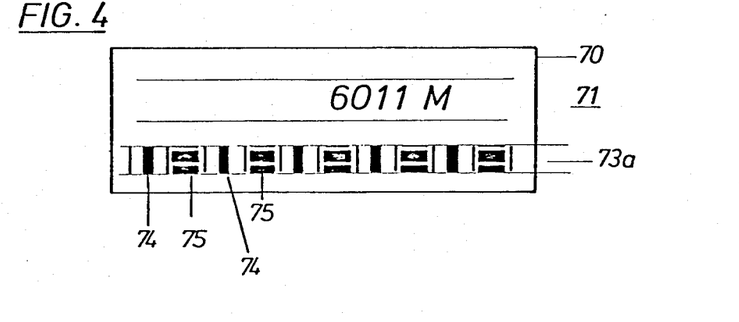
FIG. 4 shows a fourth embodiment of a data field having a contrasting line pattern track defined by alternating contrasting line patterns of a first and of a second type.

FIGS. 1 and 4 show a variety of identifications 70, for example price tags which may be affixed to containers, packages, a product, paper, forms or the like. They appear in random positions and orientations on an image window 2 of a vidicon 3, see FIG. 5.

The identifications 70 define a data field which includes contrasting symbols 72 in at least one data track 71 for identifying the object or article to which it is applied. The contrasting symbols are preferably optical character signals of one of the known, machine readable types as OCR-A or OCR-B characters.

A plurality of contrasting line patterns 74, 75, 76, hereinafter sometimes referred to as product identifying code, or PIC, are disposed on the data field in predetermined positions and orientations relative to the data track. The PIC comprises a plurality of lines having a given line spacing and a given line width and positioned adhead, beneath, above, or behind the data track or tracks.

FIG. 1 shows three identical PIC patterns 74 of concentric circular lines having differing widths and which are disposed beneath the data track 71. Alternatively, the line patterns can have a rectangular, square, triangular or similar shape. However, as compared with other closed PIC patterns, the circular shape shown in FIG. 1 is advantageous because when it is scanned in a raster having raster lines 80 the relative position of the data field 70 is of no effect. Thus, the central coordinates of the PIC patterns 74 are readily calculated from the coordinates of the points of intersection which can then be stored in the circuitry shown in FIG. 5. A straight connection line 73 between the two outer PIC patterns 74—and thereby also the angle $\beta$ between the raster lines 80 and the connection line—can then be calculated. According to FIG. 1 the connection line 73 is parallel to the data track 71. Thus, the relative position of the data track 71 in the coordinates system of the detection raster is also known, which permits the subsequent rotation of the raster as may be required.

Figure 2:
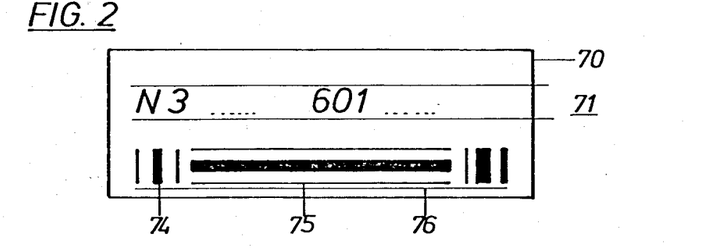
FIG. 2 shows a second embodiment of the data field having a plurality of different contrasting line patterns.
Figure 3:
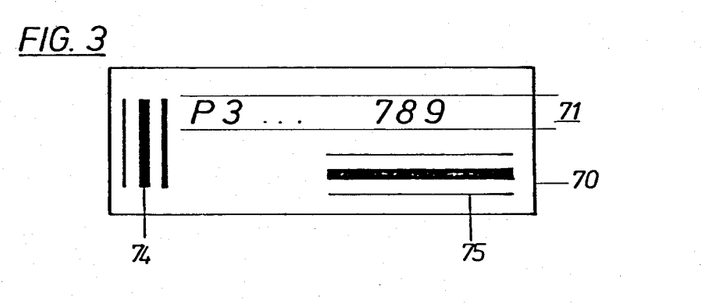
FIG. 3 shows a third embodiment of a data field with two different contrasting line patterns which precede and follow a data track.

FIGS. 2 to 4 show data fields having a variety of PIC patterns of parallel lines with differing line spacings and line widths. FIG. 2 illustrates a contrasting line pattern of the first type 74, located beneath the data track 71, followed by a contrasting line pattern of a second type 75, which in turn is followed by a contrasting line pattern of a third type 76. The line patterns of the first and third types 74, 76 extend perpendicularly to the direction of the data track 71 and the line pattern of the second type 75. This arrangement of the PIC patterns has the advantage that raster lines 80 will normally intersect the line pattern 75 with sufficient frequency that they can be identified. The points of intersection are stored for the subsequent determination of the intersection angle $\beta$. In the event the angle $\beta$ is so small that the raster lines 80 fall to intersect the PIC pattern 75—that is, in the event the raster lines are substantially parallel to the lines of the PIC pattern 75—the raster liines will intersect the pattern lines of the first and third type 74, 76 at a relatively large angle. Thus, so long as the PIC pattern 74, 76 has a sufficient minimum length it will be identified.

FIG. 3 shows a contrasting line pattern of the first type 74 ahead of the data track 71 and a contrasting line pattern of the second type 75, which is parallel to the data track, in the lower corner of the data field 70. This arrangement of PIC patterns also insures that at any random position of the data field 70 one of the PIC patterns 74, 75 will be intersected by a sufficient number of raster lines to assure the identification of the relative position and orientation of at least one PIC pattern. From that the necessary intersection angle $\beta$ can be calculated in the raster-constant coordinate system.

FIG. 4 shows a further arrangement of contrasting line patterns in a contrasting line pattern track 73a beneath and parallel to data track 71. Contrasting line patterns of the first type 74 comprising a plurality of parallel lines extend perpendicularly to data track 71 and they alternate with contrasting line patterns of the second type 75, the lines of which are parallel to the data track. The PIC patterns 74, 75 have a sufficient length so that during scanning through the detection raster each PIC pattern 74, 75 is intersected by at least one raster line. In an exceptional case when the raster lines are substantially parallel to the track 73a, each PIC pattern of the first type 74 is intersected, and the corresponding coordinates of the intersection are stored. Conversely, when the raster lines are substantially perpendicular to track 73a, all PIC patterns of the second type 75 are intersected by them and the coordinates of these intersection points are stored. In all other cases the PIC patterns of the first type 74 as well as the PIC patterns of the second type 75 are intersected. In all cases, a sufficient number of intersection coordinates are available for calculating the track direction 73a and thereby the intersection angle $\beta$ between the raster lines and the data track 71. The arrangement of FIG. 4 has the advantage that the direction of the track 73a and thereby the needed intesection angle $\beta$ can be calculated with a high degree of redundancy. Further, the uniform appearance of the PIC patterns beneath the data track 71 does not interfere with the visibility of the symbols on data track 71.

Although the drawings only show PIC patterns having three lines, PIC patterns having more than three lines can also be used. Further, the PIC patterns can be arranged in positions and in orientations relative to the data tracks which vary from what is shown in FIGS. 1-4. It is equally possible to use PIC patterns with lines which are parallel to each other, curved or undulated, although their identification and the subsequent calculation of required coordinates is generally more involved. It is important, however, that the PIC patterns are electronically readily identifiable, that the position and orientation of the PIC patterns relative to the data tracks and the edges of the identification 70 be known, and that PIC patterns of a sufficient number and sufficient size be provided, so that during scanning through the detection raster the position and/or orientation of faulty PIC patterns can be determined.

Figure 5:
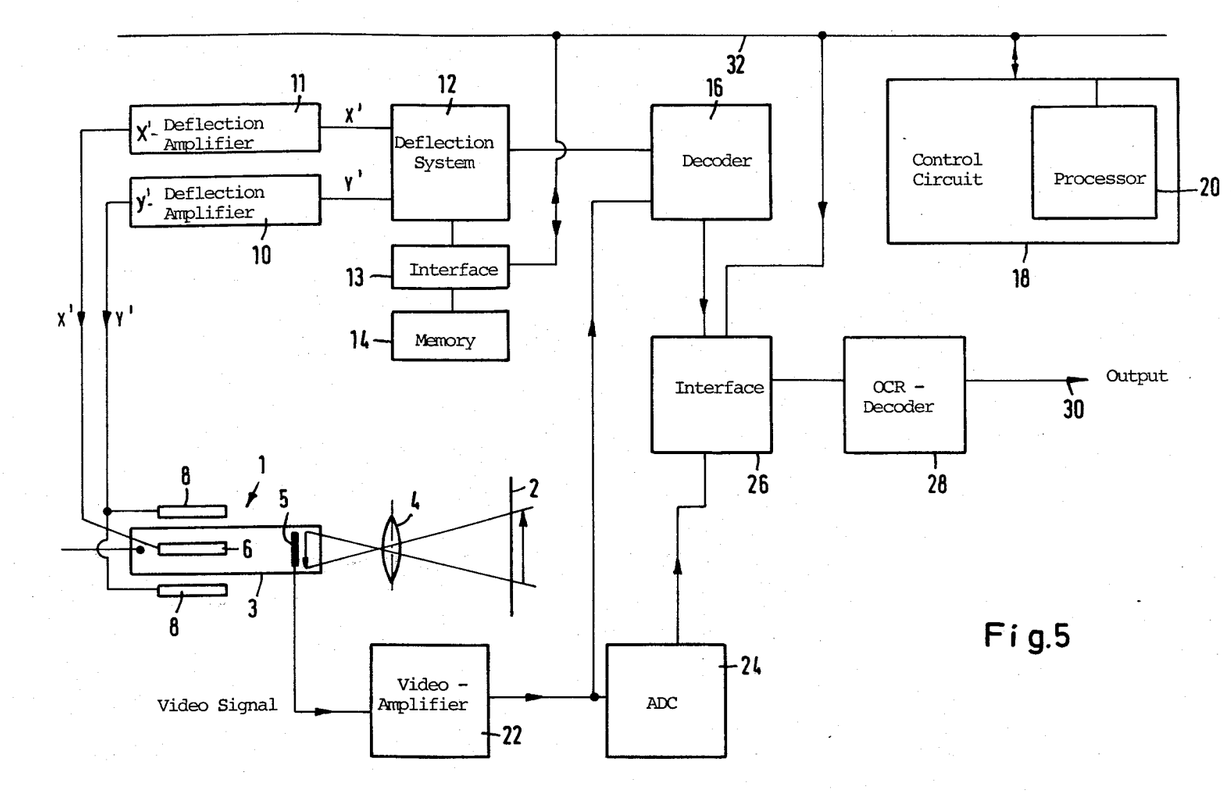
FIG. 5 is a block diagram of an apparatus constructed in accordance with the present invention.

FIG. 5 schematically illustrates in block diagram form a system constructed in accordance with the invention. An image window 2, for example a stationary illuminated glass plate with a diameter of about 10 cm to about 20 cm is projected onto a target 5 of a vidicon 1 via a stationary lens system 4. The vidicon has two pairs of deflection coils 6, 8, which are offset by 90° relative to each other, on the outer periphery of a vacuum picture tube 3. Pairs of electrostatic deflector plates may be substituuted for the deflection coil pairs 6, 8. The first pair 6 of deflection coils is disposed in a plane passing through the axis of the picture tube 3. The line of intersection of this plane with target 5 forms an image window or picture tube constant x'-direction. When a voltage is applied to deflection coil pair 6 with scanning beam emerging from the cathode of the vidicon 1 is deflected in x'-direction.

The second deflection coil pair 8 is disposed in a second plane which also passes through the axis of the picture tube 3. The line of intersection between the second plane and target 5 determines the image window or picture tube constant y'-direction which is perpendicular to the x'-direction. When a voltage is applied to the deflection coil pair 8, the scanning beam is deflected in y'-direction.

Deflection coils 6 are connected with an x'-deflection amplifier 11. Deflection coils 8 are connected with a y'-deflection amplifier 10. The deflection amplifiers 10, 11 receive their input voltages from a deflection system 12 which includes a first generator 40, 44 that emits periodic line deflection signals for deflection in the raster-constant x-direction. The deflection system includes a second generator 42, 46 which emits a line advance signal for deflection in the raster-constant y-direction. A memory 14 is coupled to deflection system 12 via an interface 13.

The first generator 40, 44 generates a periodic line deflection signal which increases from a predetermined low amplitude to a predetermined high amplitude. The amplitude then returns to its initial value and thereafter rises again following a time delay to allow for the return of the scanning beam to its starting position. A full period of the line deflection signal deflects the scanning beam in the x-direction from a given starting point to a given end point. Each time the line deflection signal has reached its end amplitude the first generator 40, 44 triggers the second generator 42, 46. The line advance signal generated by the latter is thereupon incrementally advanced by a predetermined amount so that during the next period of the line deflection signal, the scanning beam scans a line which is parallel to the preceding line. Thus, deflection system 12 scans target 5 of vidicon 1 line by line.

The output of the target 5 is a video signal which changes in accordance with changes in the amplitude of the scanned contrast sequence. So long as only black-white contrasts are used as the product identifications which appear at the image window the video signal is essentially a binary signal. In such an event its first amplitude corresponds to the color black, and its second amplitude corresponds to the color white. The video signal is fed to a video amplifier 22 the output of which is connected with an analog to digital transducer (ADC) 24. The ADC converts the video signal into at least two amplitudes, namely the amplitude "black" and the amplitude "white" which, for example, may be given the binary values "1" and "0". It is also possible to use an ADC which converts intermediate amplitude values of the videosignal into digital values. This permits one to recognize shades of gray in the scanned optical symbols which can then be converted into amplitude "black" or amplitude "white". The output of the ADC 24 is connected via an interface 26 with a decoder 28. When machine readable OCR characters are used, decoder 28 decodes the digital input signal so that the information carried by it regarding the contrasting symbols can be identified. The output 30 of the decoder is a digital output signal which, for example, can be used by a printer or supplied to a display device.

The output of the video amplifier 22 is also connected with a PIC decoder 16 so that during the scanning of each raster line it can be determined whether the scanning beam has crossed a PIC pattern. Upon identification of a PIC pattern, the PIC decoder 16 emits an output signal "PIC OUT" to the deflection system 12 which thereupon initiates a new method step. After a predetermined time delay, the PIC decoder 16 triggers interface 26 which activates OCR decoder 28 so that a subsequently arriving digitalized video signal can be decoded as OCR characters. The PIC decoder 16 identifies various PIC patterns 74, 75, 76 (see FIGS. 1-4) and upon identification emits an identification signal PIC OUT, PIC OUT I, PIC OUT II, and so forth, thereby identifying the respective PIC pattern. A circuit as disclosed in German patent application P 29 15 732.2-53, or in U.S patent application Ser. No. 140,936, filed Apr. 16, 1980, may, for example, be used as PIC decoder 16.

The system shown in FIG. 5 further includes a control circuit 18 having a processor 20 which is connected via a bus 32 with interface 26, interface 13, and memory 14. The control circuit controls the individual method steps and performs the calculations required in the course of the process as is further fully described below.

The data field appears on image window 2 in random positions and random orientations. In a first step of the method of the present invention, the detection step, target 5 of vidicon 1 is scanned in a stationary detection raster and the PIC pattern or patterns are intersected by raster lines and identified. In a subsequent second method step, the readout step, the data field is scanned in direction of the data tracks in a narrowly spaced raster, and the signals in the data tracks are read out and decoded.

Figure 7A:
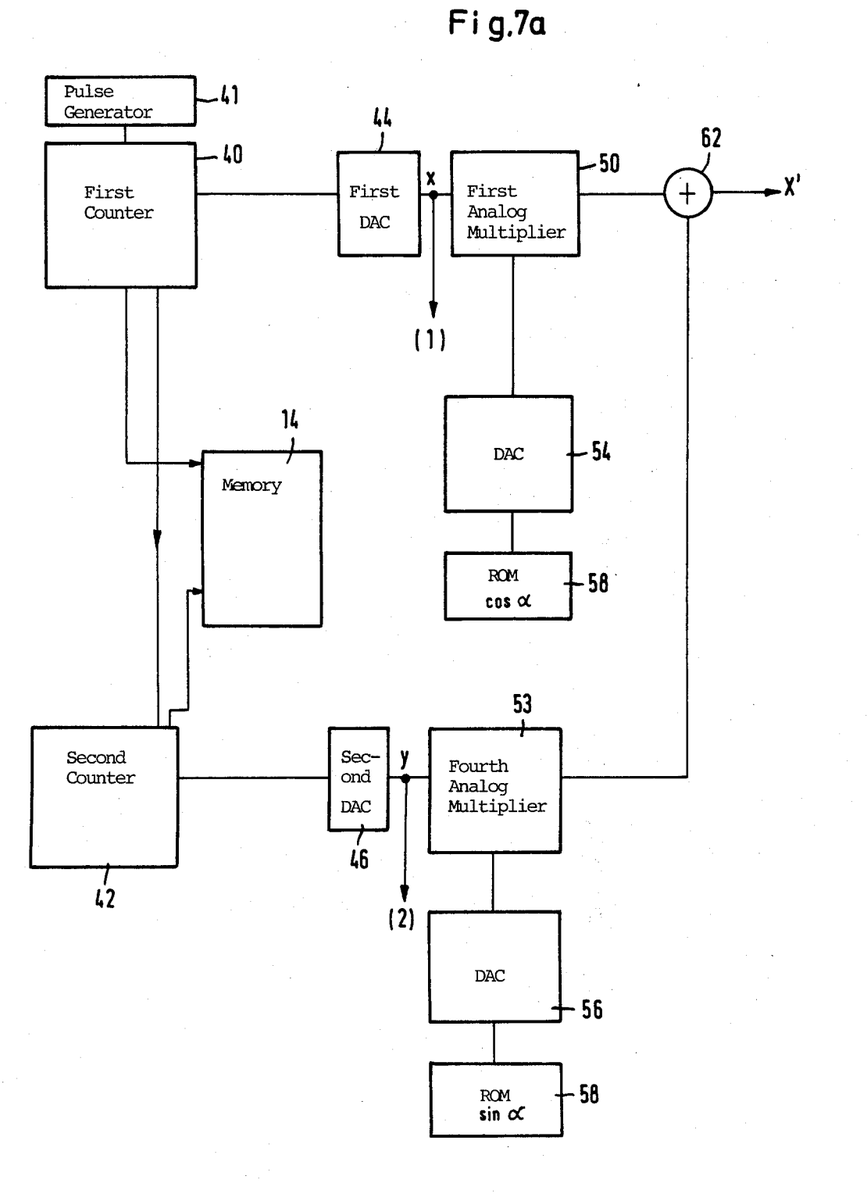
FIGS. 7a and 7b are a block diagram of a deflection system of the apparatus of the invention.
Figure 7B:
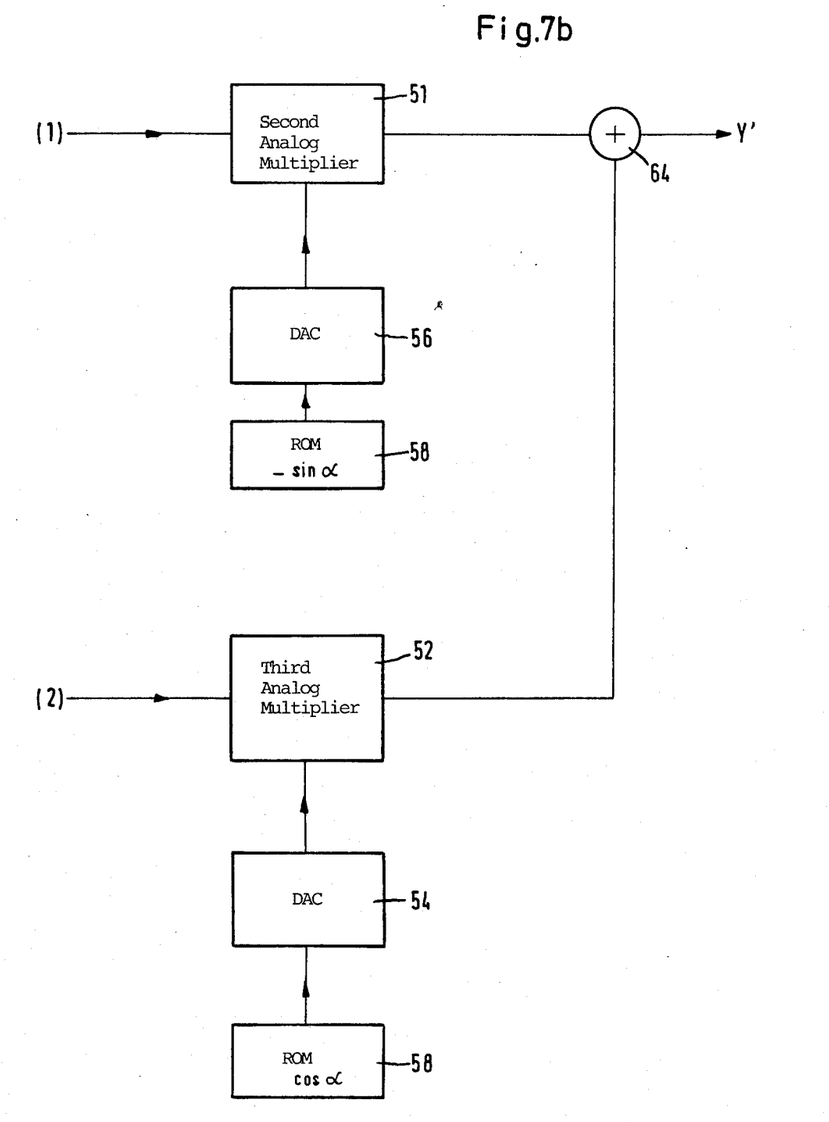

In order to rotate the raster electronically as required for carrying out the third method step, so that the raster lines are parallel to the data tracks, deflection system 12 includes a raster rotating circuit 50 to 64, see FIGS. 7a and 7b. In the rotating circuit the line deflection signal of the first generator 40, 44 and the line advance signal of the second generator 42, 46 are weighted and combined so that signals are fed to the deflection coils 6, 8 which cause the rotation of the scanning beam by a desired angle ρ relative to the constant picture tube x'-, y'-coordinate system.

Figure 6A:
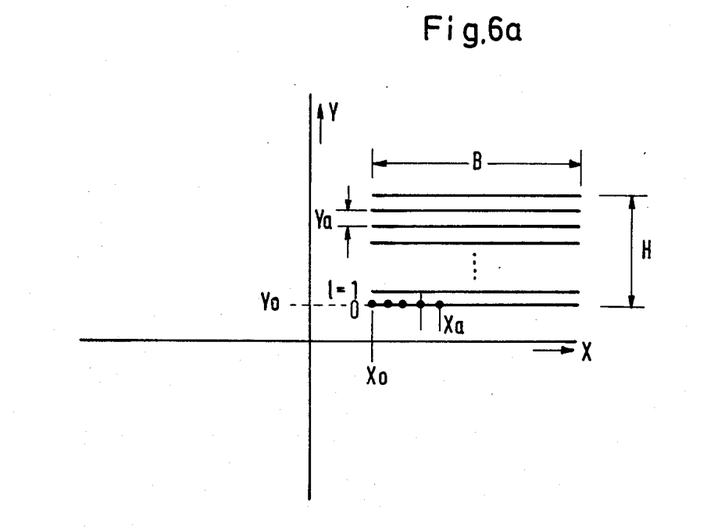
FIGS. 6a and 6b are a schematic representation of a scanning raster rotated in a stationary coordinate system.

FIG. 6a schematically illustrates a raster in the raster-constant x, y coordinate system. The rotated raster coincides with the x'- and y'-directions of the tube coordinate system and is generated by the line deflection signal of the first generator 40, 44 as well as by the line advance signal of the second generator 42, 46. The raster starts—see FIG. 6a in the x, y system—at the starting coordinates $x_o$, $y_o$. The spacing between lines is "ya". According to the invention, the raster lines are scanned point-by-point with a predetermined spacing between image points "x"$_a$. The angle through which the raster must be rotated in relation to the x-, y-direction is "ρ". "H" is the height of the raster and "B" is the width of the raster which corresponds to the line length. "z" is the number of lines and "k" (t) as well as l (t) indicates the incremental speed at which the raster points or the individual raster lines are advanced or scanned. The raster may then be expressed as follows:

$$x = x_o + x_a k(t) \quad (1)$$

$$y = y_o + y_a l(t) \quad (2)$$

$$y_a = H/(z-l) \quad (3)$$

$$x_a = B/k_{max} \quad (4)$$

wherein $$0 \leq l(t) \leq (z-l)$$

$$0 \leq k(t) \leq k_{max}$$

In order to rotate the raster defined by the equations (1) and (2) through the angle "ρ", the coordinates x, y must be calculated in accordance with well known mathematical formulae as follows:

$$x' = x \cos \rho + y \sin \rho \quad (5)$$

$$y' = -x \sin \rho + y \cos \rho \quad (6)$$

Figure 6B:
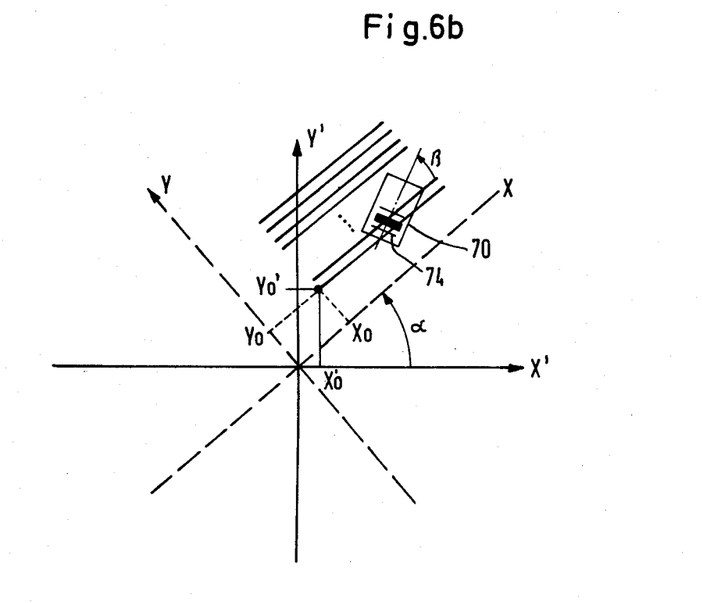

Thus, after rotation the coordinates x, y of the x-, y-coordinate system become coordinates x', y' in a non-rotated, constant picture tube or image window x', y' coordinate system; see. FIG. 6b.

The deflection voltages applied to the deflection coils 6, 8 for generating the scanning raster are proportional to the deflection of the scanning beam. That is, they are proportional to the coordinates of the currently scanned raster point. Thus, the raster defined in equations (5) and (6) and rotated in the picture-tube x', y'-coordinate system corresponds to the deflection signal raster except for a proportionality factor "K" which is identical for the two deflection coil pairs 6, 8 and, for simplicity's sake, is given the value 1. Thus, the rasters according to the equations (1) and (2), and (5) and (6), respectively, represent the coordinates of the scanning raster and amplitude coordinates of the corresponding deflection signal raster.

FIGS. 7a and 7b show a block diagram for the deflection system 12 constructed according to the invention for generating a raster rotated in accordance with equations (5) and (6). Due to its construction, the deflection system also advantageously permits the precise determination of the angle at which the raster lines intersect an identified PIC pattern.

According to FIGS. 7a and 7b, the deflection system 12 has, as discussed above in connection with FIG. 5, a first deflection generator 40, 44 which periodically generates a line deflection signal for deflecting the scanning beam in the raster-constant x-direction, and a second deflection generator 42, 46 for emitting a line advance signal which line advances the beam in the raster-constant y-direction. The deflection system further includes the raster rotating circuit 50 to 64 which weights and combines the output signals of the first and of the second generators to effect the desired angular rotation and then delivers them to deflection coil pairs 6, 8.

The first generator 40, 44 includes a first pulse counter 40 which has a given pulse frequency and a given maximum counting interval. A first digital-analog converter 44 converts the count of the first counter 40 into a line deflection signal which is incrementally advanced proportional to the count to effect the point-by-point scanning of the raster lines and which is then fed to the raster rotating circuit 50 to 64. The maximum counting interval corresponds to the largest possible number of raster points $k_{max}$ within each raster line. Successive counts correspond to adjacent raster points.

The second generator 42, 46 includes a second pulse counter 42. Its count is incrementally advanced when the first counter 40 reaches the upper limit of its counting interval and is converted by a second DAC 46 into a line advance signal that is proportional to the count and, therefore, is incrementally advanced therewith. The line advance signal is fed to the raster rotating circuit as well as to the control circuit 18.

The control circuit 18 is also connected with the first counter 40 and starts the latter again after each of the second counter 42. The maximal counting interval of the second counter corresponds to the largest possible number $z_{max}$ of raster lines. Successive counts are allocated to adjacent lines via the line advance signal.

The upper and the lower counting interval limits for the first and second counters 40, 42 can be adjusted to correspond to the desired start and the end of the raster lines, or to the number of desired scanning lines during target scanning. Also, the size of the incremental advance within the counting interval of the first and second counters 40, 42 is adjustable to permit one to vary the spacing between adjacent raster points or adjacent raster lines.

In the first step, the image window 2 and/or the target 5 of the vidicon 1 is scanned with a stationary detection raster to identify the PIC pattern. The counts of the first and second counters 40, 42 are stored in memory 14 as raster-constant numerical or "counting" coordinates when a raster line intersects a PIC pattern and the PIC decoder 16 identifies the PIC pattern and emits an identification signal PIC OUT, PIC OUT I, or PIC OUT II. The decoder output is stored in memory 14 together with the respective numerical coordinates for identifying the type of PIC pattern which had been recognized. Storage is initiated by a control impulse from the control circuit 18 to the binary interface 13 which identifies the recognized PIC pattern.

Reaching the upper interval limit of the second counter 42 triggers the last counting cycle for the first counter 40. The first counter is restarted for again scanning through the detection raster if, during the last scan, the PIC pattern was identified less than twice and the associated numerical coordinates are stored in memory 14.

The control circuit 18 includes a processor 20 which calculates from the stored numerical coordinates $x_p$, $y_p$ of the intersection points between the raster lines and the data tracks of the data field, the angle $\beta$ between the lines and the tracks, see FIG. 6b.

Thereafter, the first and second counters 40, 42 are started for scanning the data field with a readout raster having a small line spacing. During this scan the readout raster is rotated through the angle $\beta$ by the raster rotating circuit 50 to 64.

The first counter 40 is advanced by a pulse generator 41 that has an adjustable pulse frequency. The second counter 42 is triggered at and advanced by the end of the counting interval by the first counter.

The incremental advance of the first and of the second DAC 44, 47 is adjustable, so that the increase of the line deflection signal and/or of the line advance signal during the advance of the first or second counters 40, 42 can be preselected.

The raster rotating circuit 50 to 64 includes a read-only memory (ROM) 58 in the form of a table for storing the sine and cosine values as well as the negative sine values for all possble angles of rotation. The output of the ROM 58 is applied to a digital-analog converter 54, 56 which converts the digitally stored sine and cosine values into analog signals. The output of the DAC's 54, 56 is fed to first and second analog multipliers 50, 51. The multipliers also receive from DAC 44 the line deflection signal in analog form. In the first and second multipliers 50, 51, respectively, the line deflection signal is multiplied with the cosine and the negative sin value of the intersection angle. The raster rotating circuit further includes a third and a fourth analog multiplier 52, 53 and they receive the cosine and the sin value, respectively, of the angle of intersection as supplied from ROM 58. In addition, they receive the line advance signal in analog form from DAC 46.

The outputs of the first and fourth multipliers 50, 53 are added in a first adding unit 62. The outputs of the second and third multipliers 51, 52 are added in a second adding unit 64. The outputs of the adding units are then connected to the respective deflection coil pairs 6, 8 of the vidicon.

The raster-constant line deflection signal x and the raster-constant line advance signal y are weighted and combined according to the equations (5) and (6) in the raster rotating circuit 50 to 64 so that the signals applied to the deflection coil pairs 6, 8 correspond to a scanning raster rotated by the angle $\beta$ and thereby generate a corresponding scanning raster.

The DAC 44, coupled to the outlet of the first counter 40 for realizing the first generator 40, 44, is preferably constructed so that it emits at its analog output a time deflection signal which is proportional to the count of the counter. In other words, it emits an incrementally advancing signal which serves for the point-by-point scanning of the raster lines. The advantage of the point-by-point scanning in the line direction is that permits a relatively long stay time per scanned raster point. To the extent the stepped slope of the line scanning signal might cause disturbances in the overall circuit—because individual components of the overall circuits might have a limited transmission frequency band, for example—the DAC 44 may alternatively emit an analog signal that is time-proportionally advanced with the count. The steps of the signal may be inclined, for example, by inserting a low-pass filter. Alternatively, the DAC 44 may emit an analog line deflection signal which increases continuously in accordance with the count. Such a DAC may for example be a ramp generator which is activated by the first counter 40 at the beginning of a line to be scanned and is deactivated at the end of the line.

FIGS. 8 to 10 illustrate PIC patterns 74 in given positions and orientation relative to the data track. Each pattern has a plurality of contrasting line patterns with different spacings and/or line widths. In FIG. 8, the PIC pattern is disposed ahead of the data track, in FIG. 9 it is beneath the data track, in FIG. 10 it is at the end of two data tracks 71 and 72, and in FIG. 11, two PIC patterns 74 are imprinted at the beginning and at the end of data track 71. The PIC pattern 74 is vertically asymmetric in relation to the contrast line in order to identify the data field with regard to beginning and end of the data tracks. The PIC patterns of FIGS. 8 to 11 have a signal-free leading zone 76 and a signal-free trailing zone 78.

Although only PIC patterns with three lines have been shown, PIC patterns having more than three lines may also be used. It is further possible to place the PIC patterns—in contrast to what is shown in FIGS. 8 to 11—in other positions and other orientations relative to the data tracks. It is important, however, that the position and orientation of the PIC pattern relative to the data tracks and the sides or edges of the identification 70 are known.

The image window is optically projected onto the target 5 of the vidicon 1, see FIG. 5. In the case of the PIC patterns of FIGS. 8 to 11, and as shown in FIG. 8, the target is then scanned at a detection angle $\alpha$, or is incrementally changed by angular increments $\Delta\alpha$ until a plurality of parallel raster lines intersect the PIC pattern. The addition (with the correct sign) of the angle of intersection $\beta$ between the data track(s) and the raster lines of the detection raster and the detection angle $\alpha$ (which is equal to one or more angular increments $\Delta\alpha$) determines the angle through which the raster must be rotated from its starting position 79 in order to scan the data field in the reading step parallel to the data tracks 71, see FIG. 8.

The apparatus of FIGS. 5 to 7b is used for the reading and scanning of the data fields of FIGS. 8 to 11.

I claim:

1. In a method for identifying objects appearing at random positions, in random orientations, and at random times on an image window and having, on a surface facing the image window, an identification in the form of a data field which includes on at least one data track contrasting symbols and one or more contrasting line patterns identifying the position and orientation of the data track, the line pattern being defined by a plurality of lines with variable spacing and/or line widths, wherein the window is opto-electronically scanned line-by-line to generate a video signal which corresponds to a scanned contrast sequence appearing at the window, the method including, as a first step, detection scanning the image window in a raster having relatively widely spaced raster lines at different detection angles $\alpha$ until the contrasting line pattern has been intersected by the raster lines at least twice during the last scan; as a second step determining the position and orientation of the data track relative to the image window; and, as a third, reading step, readout scanning the data field in direction of the data track in a reading raster having a relatively narrow line spacing to read and decode the symbols on the data track, the improvement comprising:

(a) scanning the raster lines point by point;

(b) during the scanning step continuously counting already scanned raster lines and already scanned points on the raster lines currently being scanned to thereby form first and second numerical values which define the numerical coordinates (x, y) of the raster point currently being scanned in a corresponding raster-constant numerical coordinate system;

(c) during the last raster scan of the first step and upon simultaneous identification of a contrasting line pattern storing the selected detection angle ($\alpha_l$) and the numerical coordinates ($x_p$, $y_p$) of the point of intersection between raster lines and contrasting line pattern, (d) during the second step, determining an angle of intersection $\beta$ between the raster lines of the last detection scanning step and the data track from the stored numerical coordinates ($x_p$, $y_p$), and (e) during the third step, scanning through the reading raster at an angle equal to the sum of the determined angle of intersection $\beta$ and the last selected detection angle ($\alpha_l$), and reading the contrasting symbols on the data track.

2. A method according to claim 1, including the step of identifying the size of the data field with the position of the contrasting line pattern, spacing adjacent raster lines during detection scanning sufficiently close in relation to the length of the contrasting line pattern so that a plurality of raster lines intersect the contrasting line pattern during its identification, determining in the numerical coordinate system of the last detection scan and in the numerical coordinate system of the reading scan the size of the data field from the numerical coordinates, stored at the end of the first step and corresponding to the points of intersection between the first and the last raster lines and the contrasting line pattern, and thereafter limiting the size of the reading raster to about the size of the data field.

3. In an apparatus for identifying objects appearing at random positions, in random orientations, and at random times on an image window and having, on a surface facing the window, an identification in the form of a data field which includes on at least one data track contrasting symbols and at least one contrasting line pattern identifying the position and orientation of the data track, the line pattern being defined by a plurality of lines, the apparatus including an image window, a vidicon including a target onto which the image window is projected, the target being scanned line by line by a deflection system that includes an electronically rotatable scanning raster, the vidicon emitting as its output a video signal corresponding to the scanned image field and sequentially reproducing the contrasting pattern of the scanned lines as a substantially binary amplitude sequence, a decoder for identifying scanned contrasting line patterns which characterize the position and the orientation of the data track, a deflection system having a first deflection generator for periodically emitting a line deflection signal for deflection in the x-direction and a second deflection generator for emitting a line advance signal for deflection in the y-direction after the line deflection signals for a given raster line have been emitted, pairs of deflection coils which are offset with respect to each other by 90°, the coils being positioned and arranged so that their magnetic fields deflect a scanning beam of the vidicon, a circuit for electronically rotating the raster through selected angles, means for directing the deflection signals to the raster rotating circuit and for weighting and coupling the signals so that the coils effect the rotation of the raster through a desired angle, the improvement comprising:

(a) a decoder adapted to identify one or more different contrasting line patterns and which, upon identification, emits an identification signal characterizing the respective contrasting line pattern;

(b) a first deflection generator which includes a first counter having a given pulse frequency and a maximal counting interval, a first digital to analog converter coupled with the counter for continuously or incrementally converting the count of the counter into a line deflection signal which correspondingly increases, proportional to the count, continuously or incrementally and which is fed to the raster rotating circuit, the maximal counting interval corresponding to the largest possible number of raster points on each raster line, successive numerical counting values of the counter being associated with adjacent raster points via the line deflection signal;

(c) a second deflection generator which includes a second counter, the count of which is changed by a predetermined amount when the first counter reaches the upper limit of its counting interval, a second digital to analog converter coupled with the second counter for converting the count of the second counter into a line advance signal which changes proportional to the count of the second counter and which is fed to the raster rotating circuit, a control circuit which also receives the line advance signal for reactivating the first counter after a predetermined time interval following a change in the count of the second counter, the largest counting interval of the second counter corresponding to the largest possible number of raster lines in the raster, successive counts of the second counter being associated with adjacent lines via the line advance signal;

(d) a memory for storing the current counts of the first and second counters as raster-constant numerical coordinates when a raster line intersects a contrasting line pattern and the decoder identifies the contrasting line pattern and emits a corresponding recognition signal to the memory;

(e) the control circuit including means for deactivating the first and second counters after the contrasting line pattern has been identified a sufficient number of times and the associated numerical coordinates have been stored in the memory and identified with the recognized contrasting line pattern, the control circuit further advancing the detection angle $\alpha$ by a given increment $\Delta\alpha$ and storing the detection angle in the memory after the second counter has reached its upper counting interval and has thereby initiated the last cycle of the first counter, the control circuit further reactivating the first counter to commence another detection raster scan when, during the last detection raster scan, the contrasting line pattern has been identified less than m times;

(f) the control circuit including a processor for determining the angle of intersection $\beta$ between the raster lines of the detection raster and the data tracks of the data field from the stored numerical coordinates of the given position of the associated contrasting line pattern on the data field and the current detection angle $\alpha_l$, and (g) means for thereafter reactivating the first and the second deflection generators for a renewed scan through the reading raster while the reading raster is rotated by the raster rotating circuit through an angle corresponding to the sum of the last stored detection angle $\alpha_l$ and the calculated angle of intersection $\beta$.

4. Apparatus according to claim 3, wherein the control circuit is defined by software of the processor.

5. Apparatus according to claim 3 wherein the first counter includes means for adjusting the upper and lower limits of its counting interval to thereby correspond the limits to the desired beginning and end of the raster lines during scanning.

6. Apparatus according to claim 3 wherein the second counter includes means for adjusting the lower and upper limits of its counting interval to thereby correspond the limits to a desired group of raster lines that are to be scanned.

7. Apparatus according to claim 3 wherein the counters are incrementally advanced, and including means associated with the counters for varying the increments by which the counters are advanced.

8. Apparatus according to claim 3 including means operatively coupled with the first and second digital to analog converters for adjusting the line deflection signal or line advance signal emitted by the respective converters.

9. Apparatus according to claim 3 wherein the raster rotating circuit includes a memory for storing the sine and cosine values of all possible angles of rotation, a digital to analog converter coupled to each output of the memory, first and second analog multipliers for multiplying the line deflection signal with the cosine value and the negative sine value of the angle of rotation supplied by the memory, third and fourth analog multipliers for multiplying the line advance signal with the cosine value and the sine value of the angle of rotation supplied by the memory, a first adding unit coupled with the first and fourth multipliers for adding their respective outputs, and a second adding unit coupled with the second and third multipliers for adding their respective outputs, and means for applying the outputs of the adding units to the respective deflection coils.

10. Apparatus according to claim 3 including a low-pass filter operatively coupled with the input of the deflection coils.

* * * * *

UNITED STATES PATENT AND TRADEMARK OFFICE
CERTIFICATE OF CORRECTION

PATENT NO. : 4,403,339

DATED : September 6, 1983

INVENTOR(S) : Klaus Wevelsiep; Hans Schloze

It is certified that error appears in the above-identified patent and that said Letters Patent is hereby corrected as shown below: On the title page:

The name of the assignee should be Scantron GmbH & Co., Elektronische Lesegerate KG, and NOT Scranton GmbH & Co., Elektronische Lesergerate KG.

Signed and Sealed this

Third Day of April 1984

[SEAL]

Attest:

GERALD J. MOSSINGHOFF

Attesting Officer    Commissioner of Patents and Trademarks